Feb. 26, 1935.  E. V. KUEBRICH  1,992,316
NUT BLANK MACHINE
Original Filed Nov. 7, 1931   13 Sheets-Sheet 3
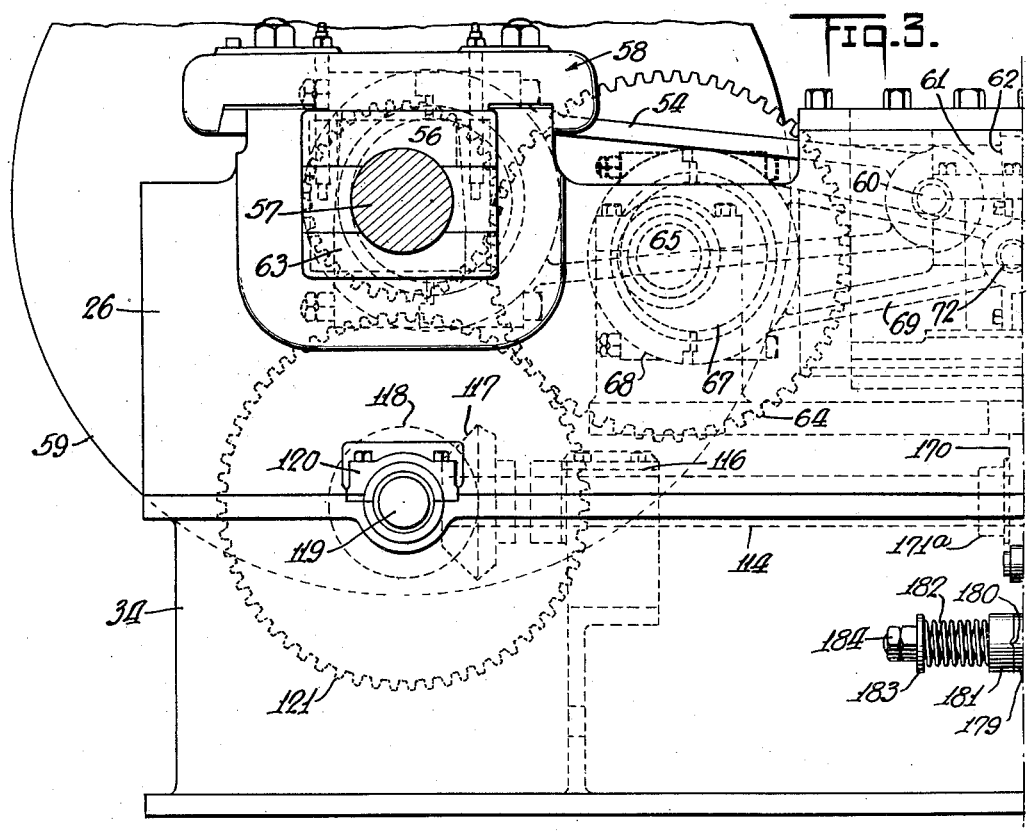
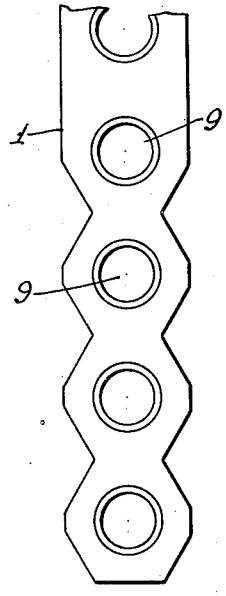
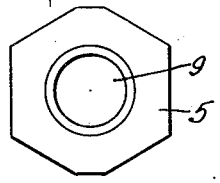 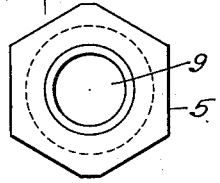 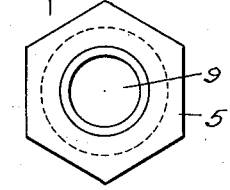
 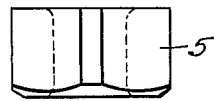 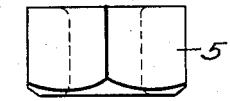
INVENTOR
Eugene V. Kuebrich
BY
ATTORNEY

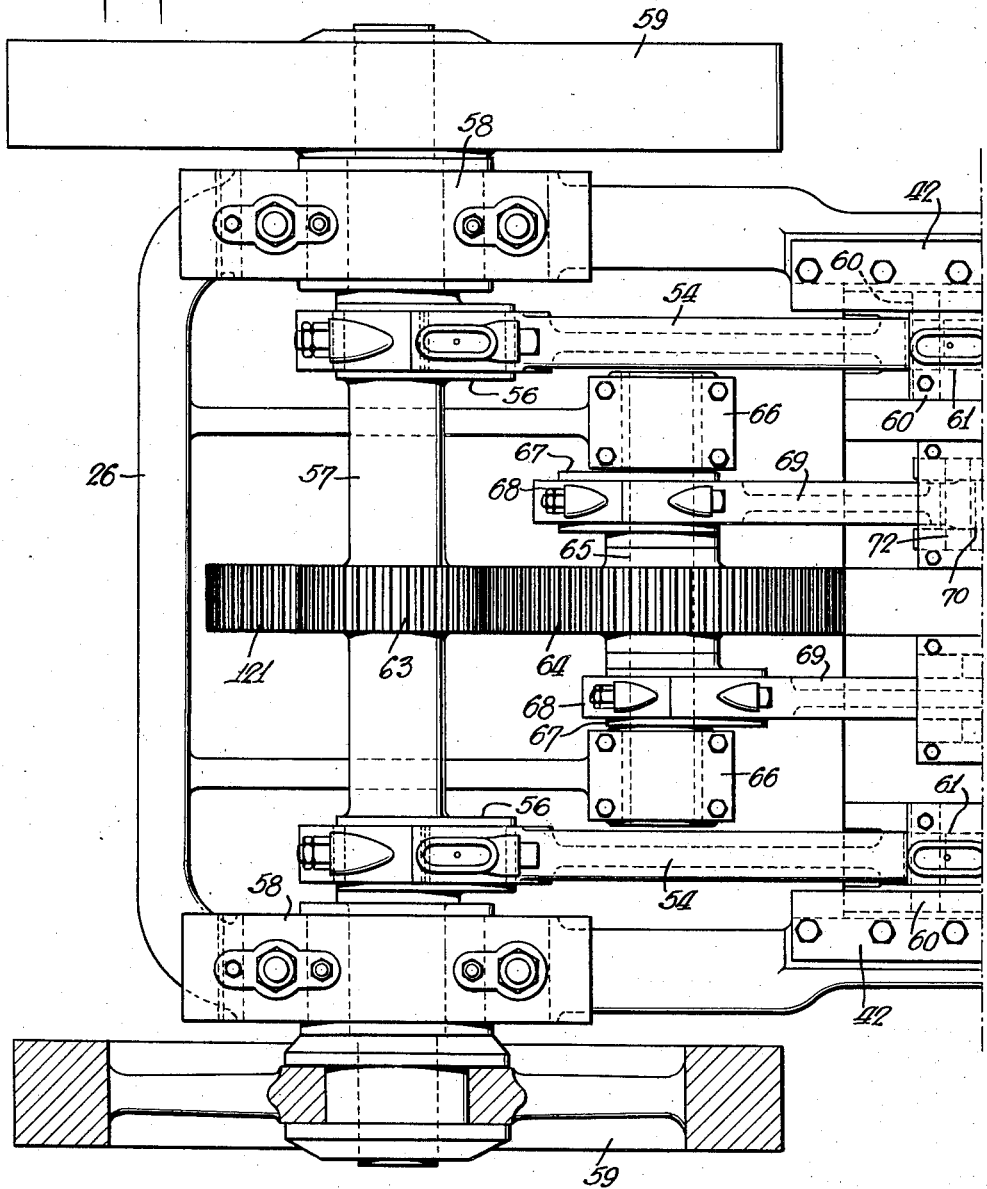

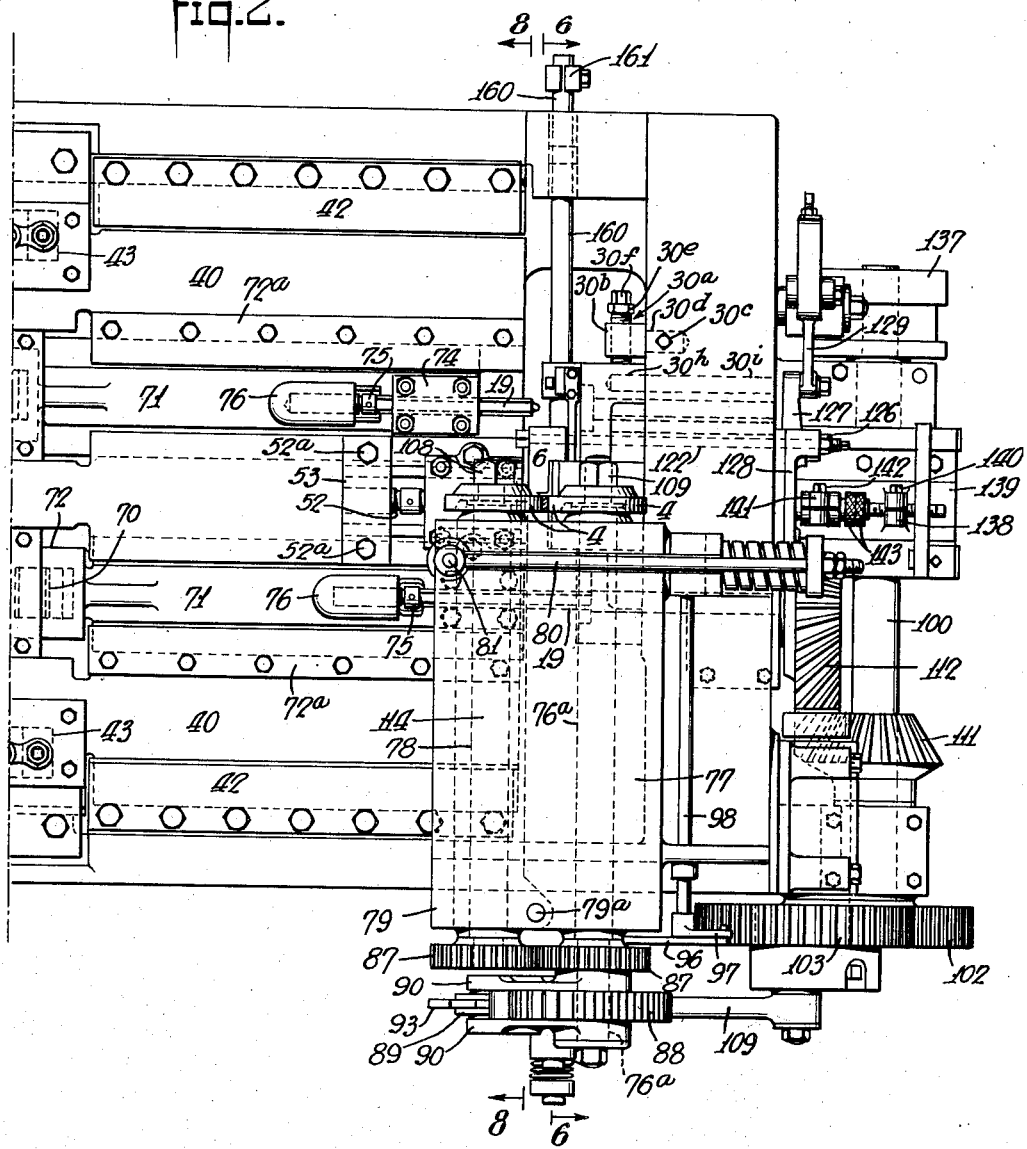

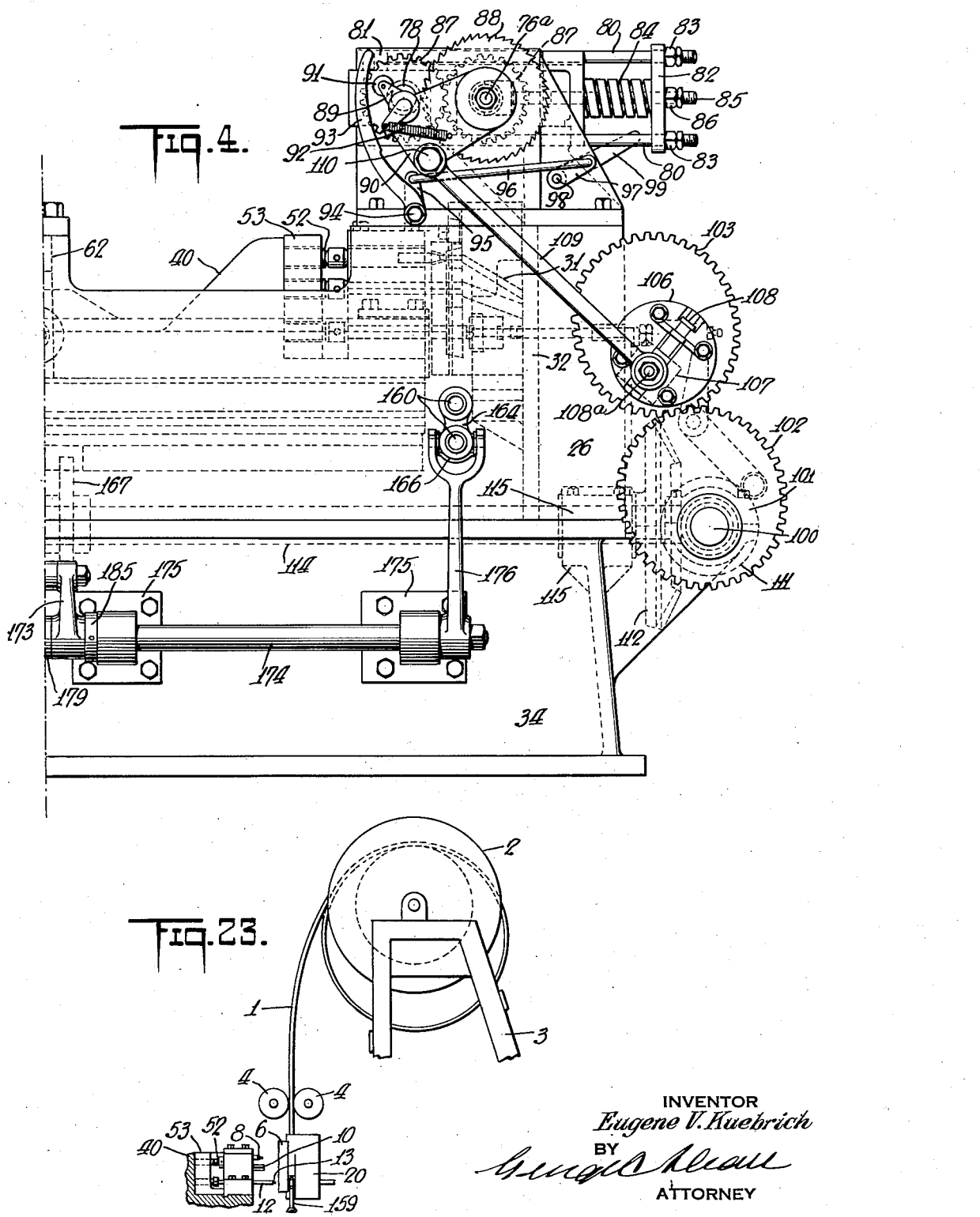

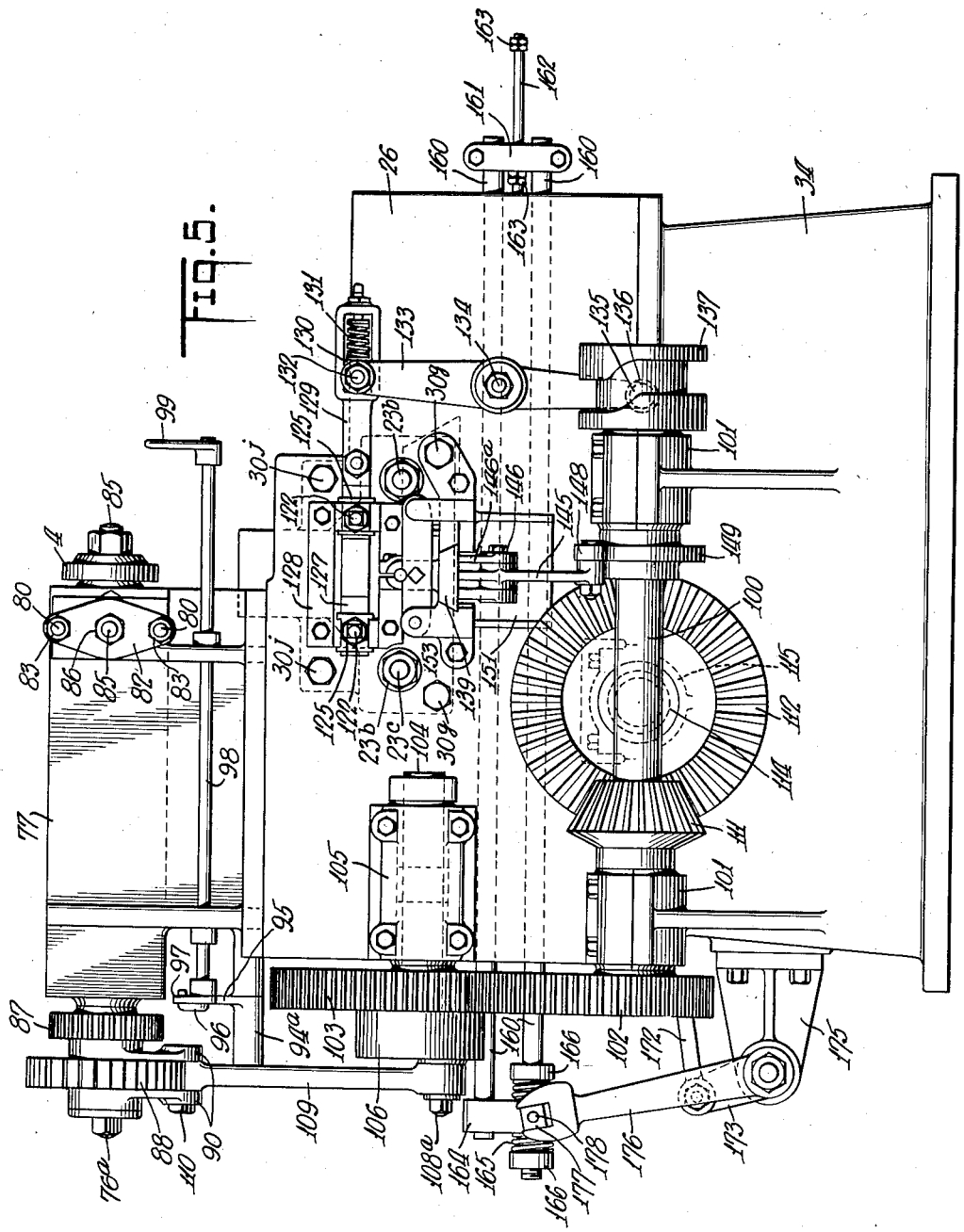

Feb. 26, 1935.　　　E. V. KUEBRICH　　　1,992,316
NUT BLANK MACHINE
Original Filed Nov. 7, 1931　　13 Sheets-Sheet 6
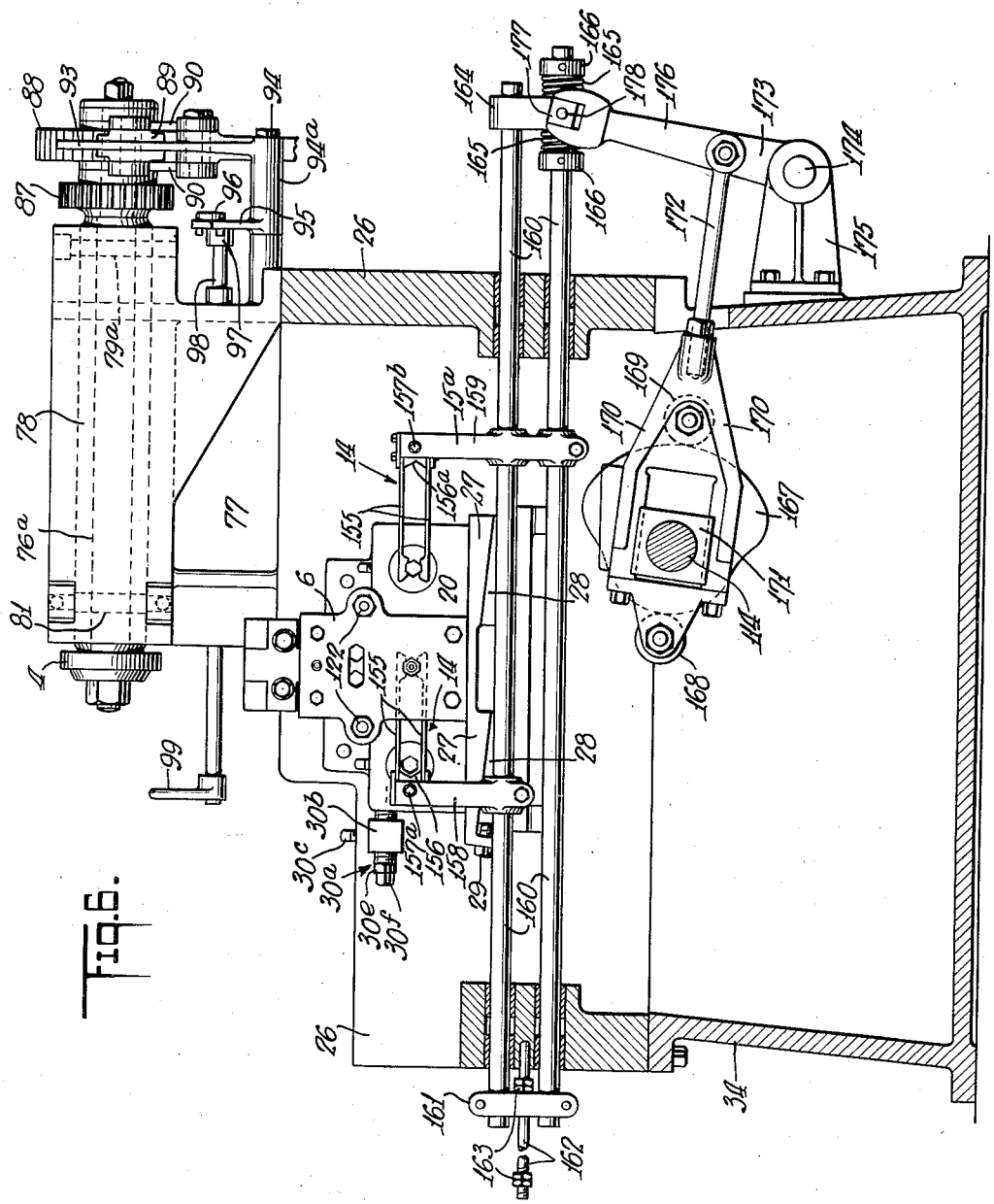
INVENTOR
Eugene V. Kuebrich.
BY
George C. Allen
ATTORNEY

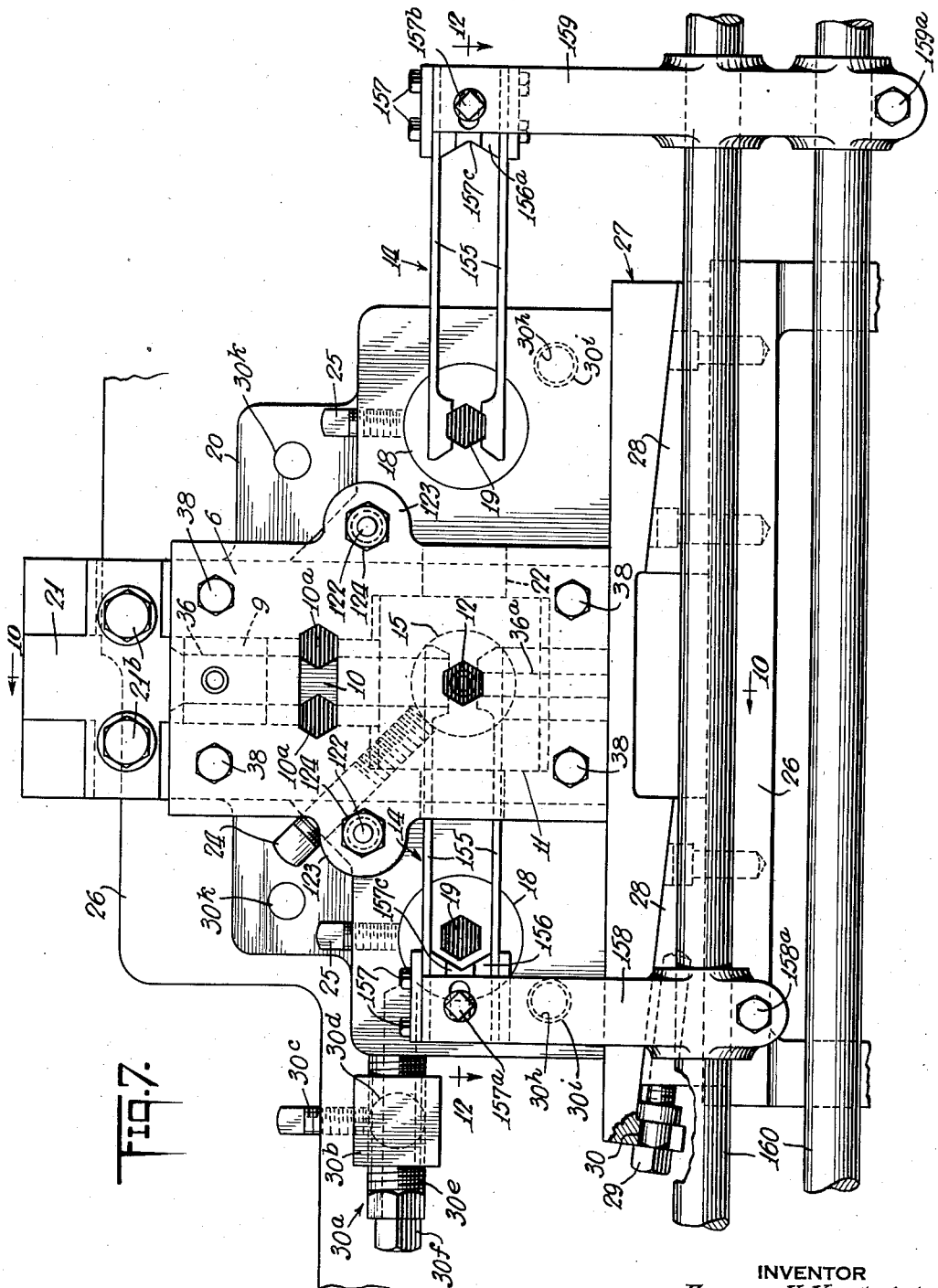

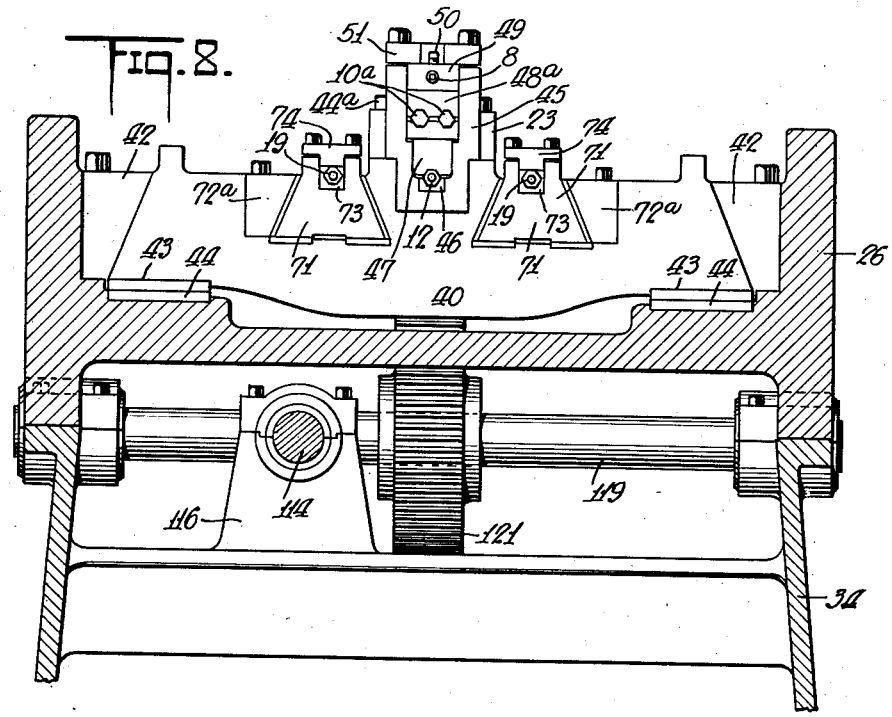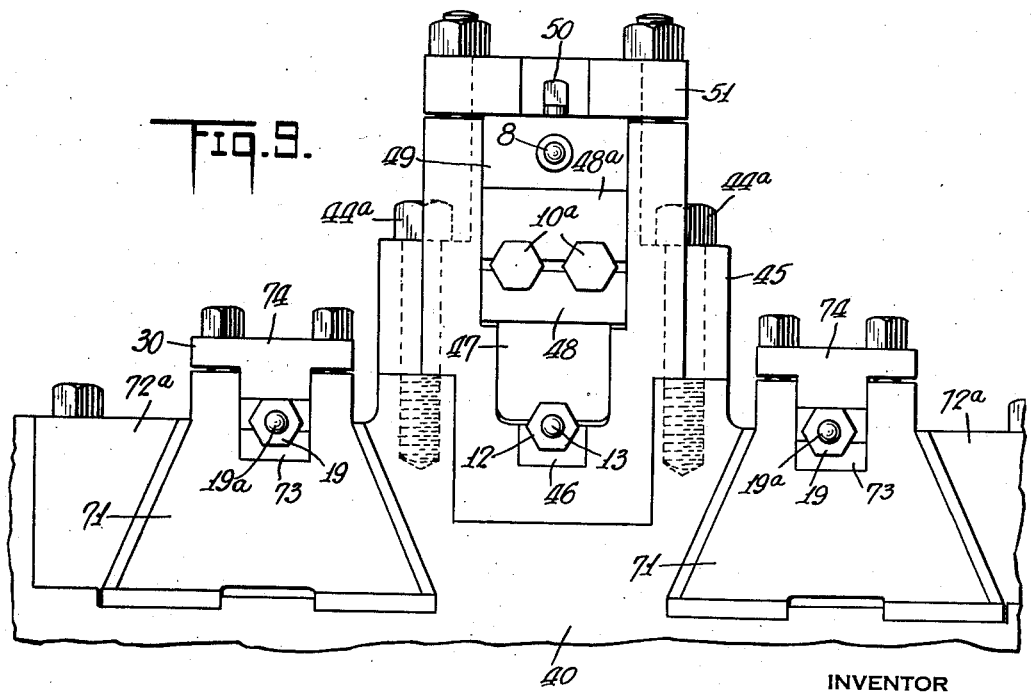

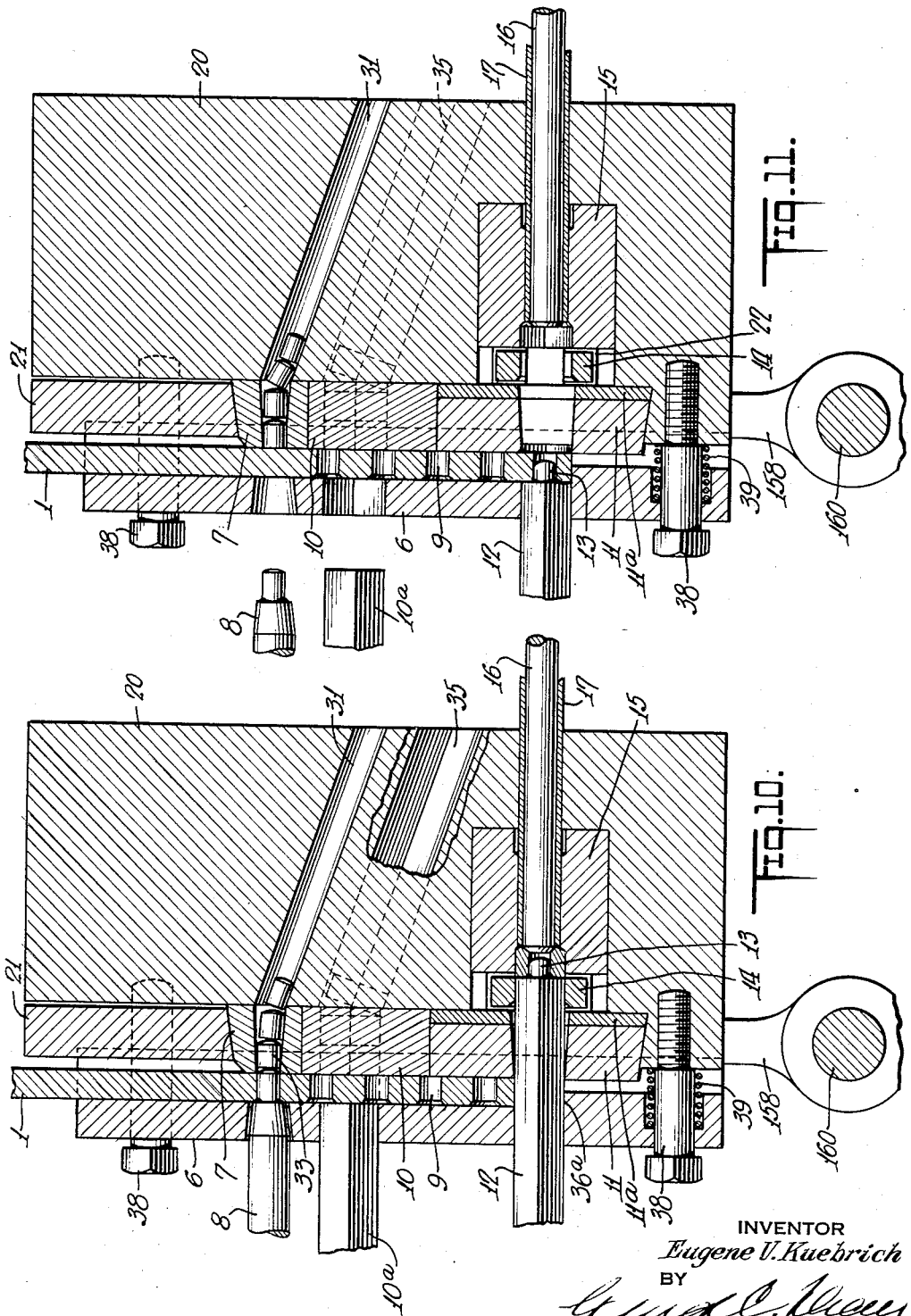

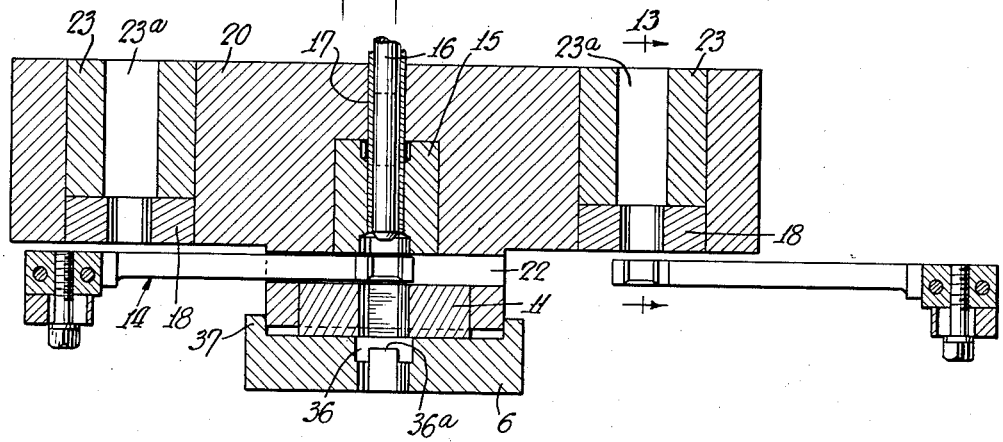
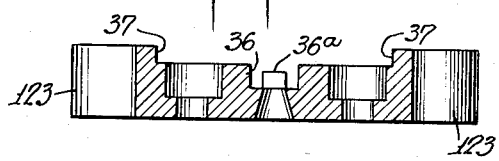
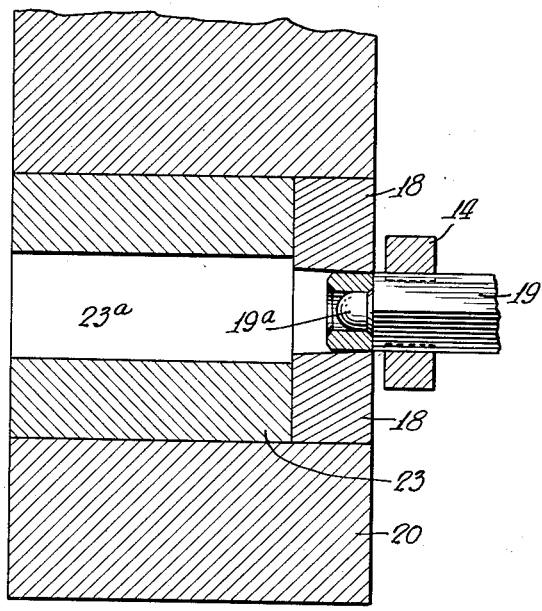
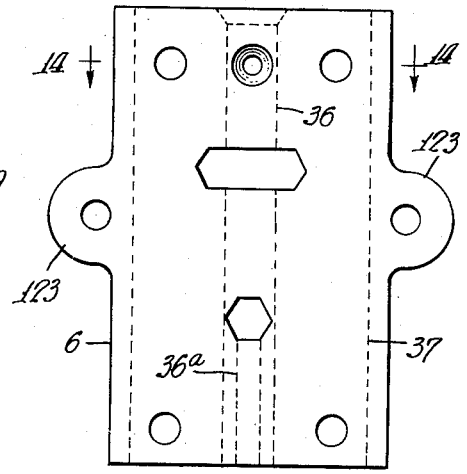

Feb. 26, 1935.  E. V. KUEBRICH  1,992,316
NUT BLANK MACHINE
Original Filed Nov. 7, 1931   13 Sheets—Sheet 11

INVENTOR
Eugene V. Kuebrich
BY
George C. Shoaf
ATTORNEY

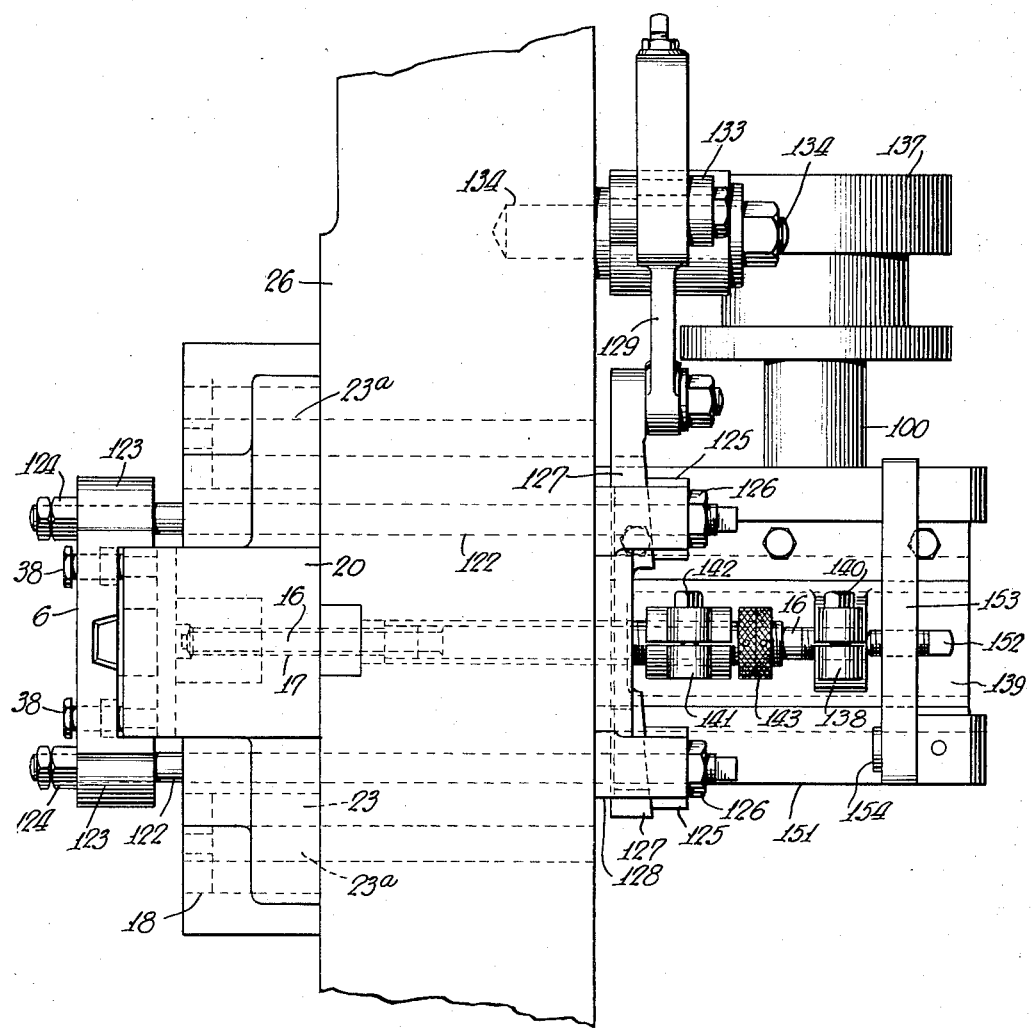

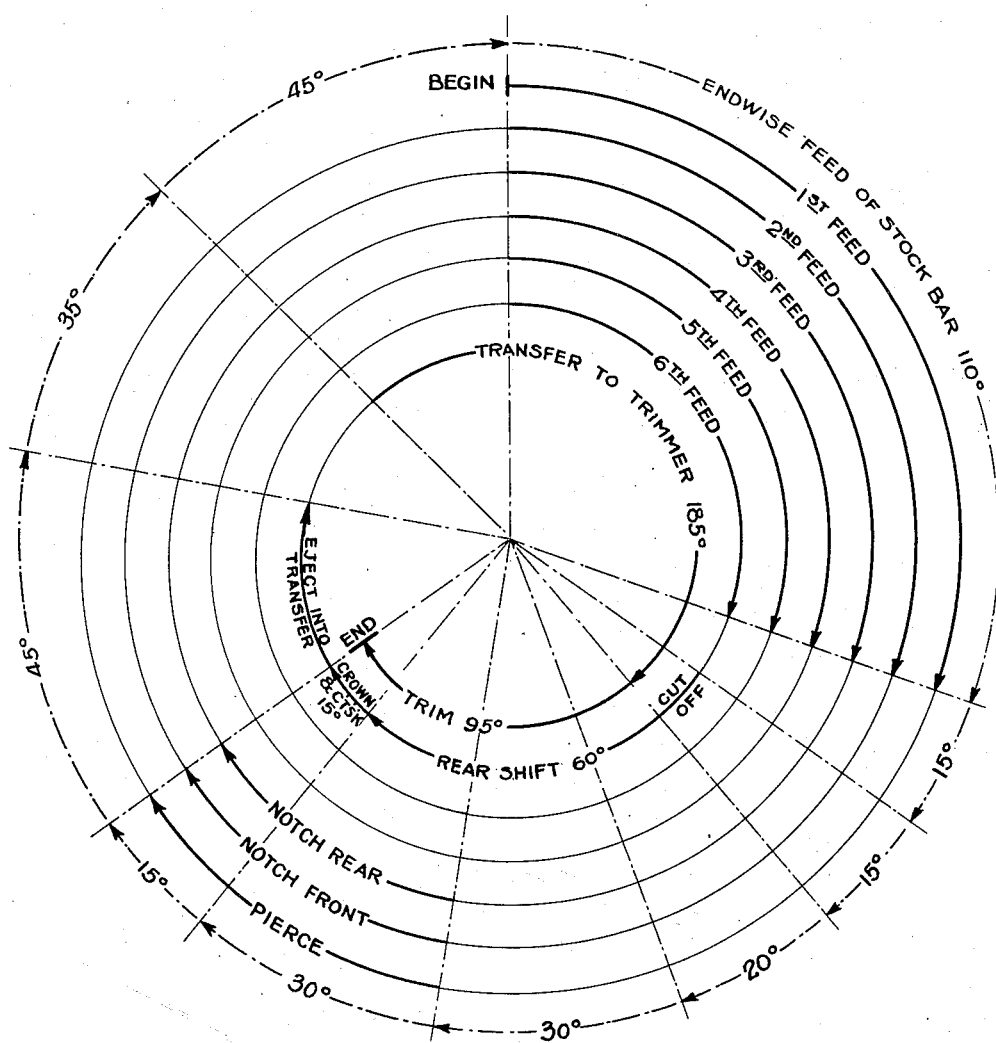

Patented Feb. 26, 1935

1,992,316

UNITED STATES PATENT OFFICE 1,992,316

NUT BLANK MACHINE

Eugene V. Kuebrich, North Tonawanda, N. Y., assignor to Buffalo Bolt Company, North Tonawanda, N. Y., a corporation of New York Application November 7, 1931, Serial No. 573,594
Renewed January 16, 1935

22 Claims. (Cl. 10—76)

My present invention is disclosed as embodied in a machine adapted for high speed production of cold punched nut blanks, but certain features of the invention are applicable to the manufacture of articles other than nut blanks.

The machine provides for a plurality of working steps or operations wherein a strip or bar is intermittently advanced step by step and, between steps, is subjected to successive forming operations simultaneously performed on successive blank forming portions of the strip. Preferably, these forming operations include first punching out the central slug substantially back of the leading end of the strip and cutting off of the perforated nut blank at its leading end. The nut blanks are crowned and trimmed; and the pierced openings through the blank are countersunk in connection with certain of such operations. Where the nuts are hexagonal or octagonal, the bar may also be notched at its edges between the piercing and cut-off operations.

My invention contemplates an arrangement whereby advantageous feeding of the stock and disposal of the waste metal may be effected, for example, an arrangement in which the stock is fed downwardly step by step to the mechanism operating thereon. Preferably, such downward feeding of the stock is in a vertical direction and the punching devices up to and including the cut-off punching devices are correspondingly arranged.

In forming hexagonal nuts, for example, the stock strip is first pierced centrally at intervals determined by the step by step feed, is notched at opposite edges between the centrally positioned openings, and at the end of each feeding step, a slug or blank of approximately hexagonal shape is cut off from said strip. Counter-sinking at the ends of the central openings may be produced at any suitable stage of the operations, and preferably counter-sinking at the entrance end of each punched opening is effected in connection with the piercing operation and at the other end of each of these openings, after the punched slug or nut has been cut-off, for example, simultaneously with a crowning or other operation which is effected by further movement of the cut-off punch after the cut-off has been effected. As illustrated in Figs. 17 to 20 inclusive, the crowning operation may be accompanied by a peripheral trimming operation and these combined operations may be followed by a final trimming operation. In the making of square nuts, the notching steps may be omitted and the cut-off varied accordingly.

Further features of the invention relate to clamping the stock rigidly in position during operations up to and including the cut-off operation, such as piercing, notching and cut-off operations; the ejection of nuts from the combined crowning and peripheral trimming or other die, located back of the cut-off die, as by forcing the nuts back during retraction of the cut-off punch; the distributive transfer of successive nut blanks to different points to receive their final trimming, and advantageous means for actuating the various mechanisms included in the machine as a whole.

The feature of distributive transfer of successive nut blanks to different points, is of particular importance in connection with high speed operation. Preferably, the transfer device shifts the blanks horizontally and, after receiving nut blanks ejected from a centrally positioned die, such as a crowning die, transfers them alternately to the right or left to final trimming positions where they are acted upon by suitable cooperating punches and dies. Countersinking in connection with the crowning operation may be obtained preferably by use of a pin having a tapered end projecting into the back of the crowning die, and ejection of the nuts may be effected preferably by means of a sleeve surrounding the pin and suitable sleeve-actuating means.

The above and other features of my invention will be more evident from the following description in connection with the accompanying drawings, in which Figs. 1 and 2, taken together, constitute a top plan view of the preferred form of the apparatus, parts being broken away to show the underlying structure;

Figs. 3 and 4, taken together, constitute a side elevation, partly in section;

Fig. 5 is a front elevation of the machine;

Fig. 6 is a section taken on the line 6—6. Fig. 2;

Fig. 7 is a view on a larger scale of part of the structure shown in Fig. 6;

Fig. 8 is a section taken on the line 8—8, Fig. 2;

Fig. 9 is a view on a larger scale of part of the structure shown in Fig. 8;

Fig. 10 is a vertical section taken along the line 10—10, Fig. 7, showing a nut cut off and carried into the crowning die by the cut-off punch, the notch punching device at the end of its forward stroke, and the piercing punch at the end of its piercing and counter-sinking operation;

Fig. 11 is a similar view showing the cut-off punch in position for the cutting-off operation and the piercing punch and the notching punch in position to act immediately after the cut-off punch;

Fig. 12 is a section taken along the line 12—12, Fig. 7;

Fig. 13 is a section taken along the line 13—13, Fig. 12;

Fig. 14 is a horizontal section of the block taken along the line 14—14, Fig. 15;

Fig. 15 is a front elevation of the stripper;

Fig. 16 is a view of the pierced and notched bar just previous to the cutting off of its lower end, the face shown being that at which the piercing punch enters;

Fig. 17 is a view of the punch-entrance face of the nut blank cut off from the lower end of the pierced and notched bar, Fig. 16;

Fig. 18 is an edge view of the blank of Fig. 17;

Fig. 19 is a view similar to Fig. 17 illustrating the nut after the crowning and countersinking operation;

Fig. 20 is an edge view corresponding to Fig. 10;

Fig. 21 is a view similar to Fig. 17 showing the nut after the final trimming operation;

Fig. 22 is an edge view corresponding to Fig. 21;

Fig. 23 is a diagrammatic side elevation illustrating the feeding of the stock to the punch mechanism;

Fig. 25 is a top plan view of the structure shown in Fig. 24; and

Fig. 26 is a timing diagram.

Figure 24:
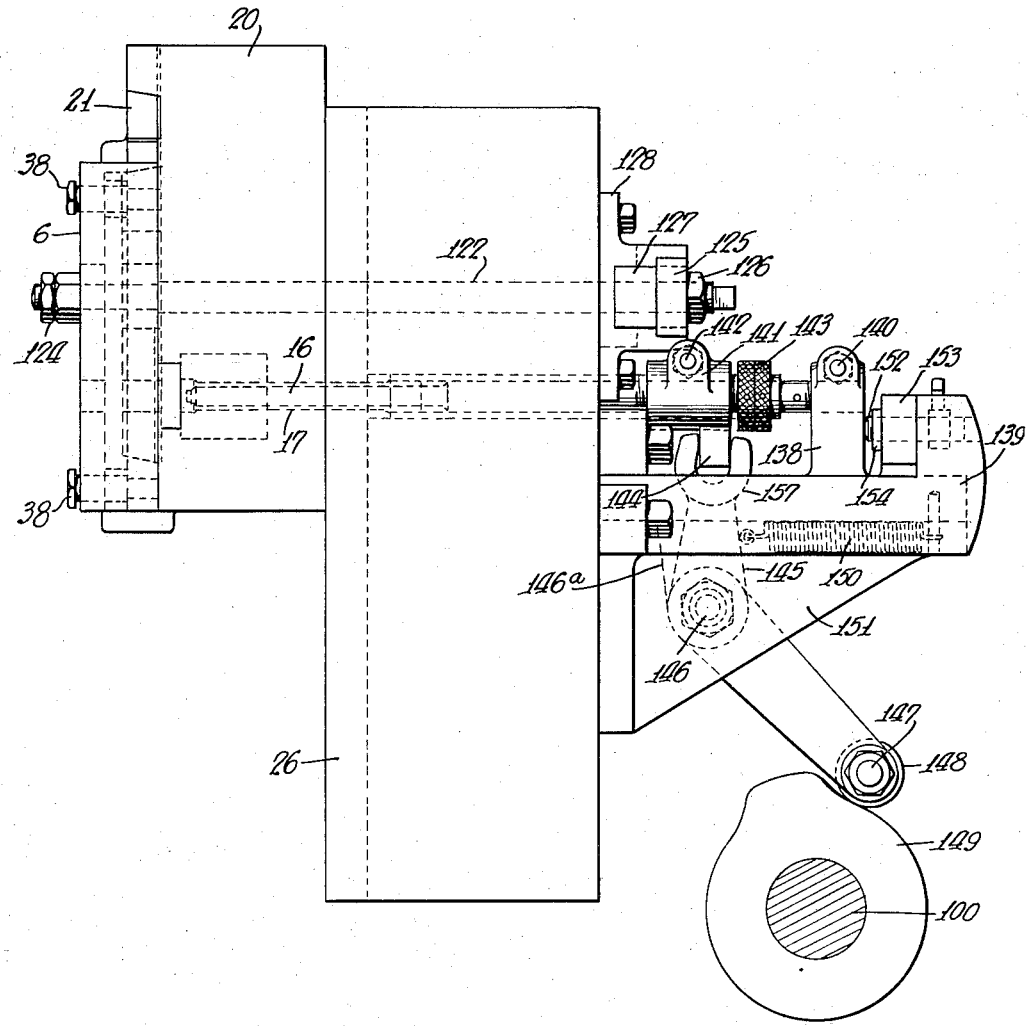
Fig. 24 is a side elevation of the mechanism for controlling the stripper, the sleeve for ejecting nuts from the crowning die, and the countersinking pin.

Preferably stock in the form of a bar or strip 1 is coiled on a drum or reel 2, on a frame 3, arranged to hold the coiled stock above the machine proper. From the reel, stock is fed downwardly into the machine by feed rolls 4 which are actuated to advance the stock substantially the length of one nut blank 5 at each feed. The stock as advanced by the feed rolls passes behind a stripper stock guide 6 and in front of a piercing die 7, where it may be pierced by a piercing punch 8, preferably so made that each pierced hole 9 is countersunk at the entrance side. The stock also passes in front of a notching die 10, preferably below the piercing punch, where it may be notched at both edges by notching punches 10a, and finally in front of a cut-off die 11 where a cut-off punch 12 having a pilot pin 13 and operating in advance of the other punches, carries the nut blank through the cut-off die and through a yielding transfer device 14 into a crowning die 15, where it is preferably countersunk at the crown side and trimmed peripherally and from which it is later ejected. The stripper stock guide 6 may also be utilized in guiding and positioning the stock and in clamping it rigidly in position during punching operations. The rear face of cut-off die 11 is provided with a stripper plate 11a.

The last mentioned countersinking is preferably effected by the beveled end of a countersinking pin 16 which extends into the crowning die. Ejection of a blank from the crowning die may be effected in any suitable manner, as by means of an ejector sleeve 17 which, as the cut-off punch recedes, advances and forces the nut blank off of the countersinking pin and out of the crowning die into the transfer device or blank receiver 14. It will be evident that this arrangement is particularly advantageous for producing the desired result.

Preferably, there are only two transfer devices 14 which are moved alternately into and out of position between the cut-off die and the crowning die and serve to transfer successive nuts or nut blanks from the crowning die alternately in opposite directions to positions in front of trimming dies 18 where they may be trimmed by trimming punches 19, each of which acts only half as frequently as the piercing, notching and cut-off punches. Each trimming punch is provided with a pilot pin 19a which, as the punch is advanced, enters the perforation in the nut blank held by a transfer device and supports the nut blank as the punch forces the nut blank out of the transfer device and into the corresponding trimming die.

The piercing punch, notching punches and cut-off punch are advanced into and retracted from the stock during each dwell or period of rest in the advance of the stock. The corresponding dies may be so spaced that, as each perforated portion corresponding to a nut blank is advanced a predetermined number of feed steps, the strip or stock is notched at both edges in front of the corresponding perforation and after the next feed movement, the stock is notched at both edges at the rear of such perforation; and, after each perforated portion is advanced, another predetermined number of feed steps, such portion of the strip will be cut off. The sequence of operations in the preferred form of machine is illustrated in the timing diagram of Fig. 26.

The dies 7, 10 and 11 are mounted in a recess in a central projection (Fig. 12) at the face of a support, such as a die block 20, and are held in position by a clamp 21. The lower part of the recess, where the cut-off die is placed, has its bottom undercut or inclined downwardly and inwardly (Figs. 10 and 11) with respect to the die block, and the lower edge of the cut-off block is shaped accordingly so that the lower edge of the cut-off die is urged toward the die block and held against movement away therefrom when this die is pressed downwardly. The notching die 10 rests on the cut-off die and the piercing die rests on the notching die, the upper edge of the piercing die being inclined upwardly and toward the die block to cooperate with a corresponding lower edge of a downward central projection of the clamp 21 which is in the general shape of a cross and is positioned in a correspondingly shaped recess in said central projection of the die block. The upper edges of the arms of the cross and the cooperating edges of the recess are so inclined that when the clamp is drawn toward the die block, as by means of screws or bolts 21b, the tendency will be to force the clamp 21 downwardly and for that in turn to press downwardly on the piercing die as well as to press it back against the die plate. In this way, all of these dies are clamped firmly in place.

The crowning die 15 is located in a chamber in the die block 20, back of the cut-off die and is spaced therefrom to provide space for the transfer devices 14 which are inserted through a suitable opening 22. The trimming dies 18 are mounted in suitable openings spaced equally, at opposite sides, from the axis of the crowning die chamber and are supported against the action of the trimming punches by members 23 fitting in these openings and extending approximately to the back of the die block 20. In the main frame 26 back of and in line with the members 23 are the adjusting screws 23b which form adjustable abutments for the trimming dies. Through the members 23 and the adjusting screws 23b are axial passages 23a and 23c through which the finished nut blanks are discharged. The trimming die abutment, namely, the members 23 and the adjusting screws 23b, is made in two parts to facilitate the removal of the die block 20 from the machine.

As shown in Fig. 7, the crowning die 15 is held in position by means including a set screw 24 and the trimming dies 18 are held in position by means including set screws 25. The faces of the trimming dies 18 are preferably slightly back of the plane of the face of the crowning die, thus allowing room for chips between the trimming dies and the transfer devices 14. An advantage of this arrangement of the trimming dies at opposite sides of the set of dies used in performing the prior operation, is that the trimming dies and punches are free from interference by the waste material from the other dies and punches.

The die block 20 may be supported against the action of the punches by engagement with the rear of a backing block or upright portion of the main frame or bed 26 of the machine, thus enabling it to be held firmly in position against the action of the punches; and may be adjustable vertically and horizontally, or crosswise, of the machine, to position the dies properly with respect to the punches.

For vertical adjustment, the die block preferably rests on a wedge 27 which has two steps resting in turn on two wedges 28 bolted to the main frame 26 and such adjustment of the die block may be obtained by means of a screw or bolt 29 passing through a downwardly opening slot in lug 30 of the wedge 27 and threaded into one of said wedges 28 (Fig. 7) the axis of the screw 29 being parallel to the planes of contact between the wedges.

The crosswise adjustment of the die block may be effected by means of a push and pull screw device 30a in a block 30b anchored in the main frame in a suitable manner, preferably by means of a set screw 30c, acting on a pin 30d projecting from the side of the block into a bore in the frame. The pushing effect is obtained by means of a sleeve 30e threaded through the block 30b and shaped at its outer end for engagement by a wrench or the like to turn the sleeve to advance it into engagement with or to withdraw it from the die block. The pulling effect is obtained by a screw or bolt 30f passing loosely through the sleeve, to allow for vertical adjustment of the die block, and threaded into the die block 20. The head of the screw 30f is shaped for engagement by a suitable implement to turn the same, and is, of course, too large to enter the bore of the sleeve. When it is desired to remove the die block from the machine, the screw 30f may be backed out of the die block, the sleeve 30e backed away from the die block, and the block 30b removed from the main frame after loosening the set screw 30c, thus removing such obstruction to sidewise withdrawal of the die block.

Preferably, the horizontal adjustment is effected after the vertical adjustment has been made, and in the following manner: Starting with the screw 30f in loosened condition, the sleeve 30e is adjusted to the desired position; the die block, if not already in that position, is moved into engagement with the sleeve by operation of the screw 30f or otherwise; and the screw is tightened to lock these parts in their adjusted positions.

After this adjustment has been completed, the die block 20 may be clamped firmly in position by lower bolts 30g (Fig. 5) inserted through the backing block and threaded into bores 30h (Fig. 7) in the die block, the openings 30i (Fig. 7) in the backing block being of greater cross section than the screw to allow for the adjustment of the die block; and by upper bolts 30j (Fig. 5) extending through the backing and threaded into bores 30k (Fig. 7) in the die block. It should be noted that the bores or openings 30h do not extend to the face of the die block where they would be undesirably close to the trimming dies.

Back of the piercing die 7 and directly in line with the hole in the die, is a downwardly inclined hole 31, drilled through the die block and communicating with a vertical slot 32 in the main frame or bed 26 of the machine. Through this hole 31 and slot 32, the slugs punched out by the piercing punch 8 are discharged into the machine base 34 to which the main frame is bolted. The base 34 is so constructed as to hold a sufficient quantity of coolant for the machine and to provide for the waste metal. The chips from the notching die 10 pass downwardly, through two downwardly inclined holes 35 which are in line with the holes in the notching die 10, into said vertical slot 32. By having the waste discharge openings or holes inclined with respect to the members through which they pass, it is possible to obtain a greater length of passage and to control the position at which the waste is discharged. Adjusting screws 23b (Fig. 5) extend through the backing block to form adjustable abutments for the trimming dies 18; and these screws are formed with axial passages 23c, through which the finished nut blanks are discharged.

To obtain the best results, the stock should be held from sidewise movement from the proper path across the vertically arranged set of dies, should be accurately positioned lengthwise when the punches act thereon, and also should be clamped firmly across the dies when the punches act. The stripper or stock guide 6 (Figs. 7, 12, 14 and 15) may be utilized for all of these purposes.

For the prevention of sidewise movement of the stock, the stripper or stock guide 6 is provided, at its face adjacent to the die block, with a groove 36 to receive the stock strip or bar 1; with a stop 36a in this groove substantially level with the lower limit of the opening in the cut-off dies; and, at its edges, with flanges 37 to engage the sides of the central forward projection of the die block containing dies, such as the piercing, notching and cut-off dies.

The stripper is preferably made movable toward and from the die block and to this end is held in place on the die block by four bolts 38 around which are springs 39 tending to force the stripper away from the die block and against the heads of the bolts which may be made the proper length to give any predetermined travel to the stripper, or may be adjustable. This arrangement enables the stripper to be spaced away from the die block sufficiently to allow some freedom, during feeds, for the stock in the groove at the back of the stripper and also enables the stripper to be forced, by suitable means to be described hereinafter, toward the die block to clamp and hold the stock rigidly against the dies. This clamping prevents twisting of the bar or stock thus eliminating any tendency of the punches to cramp in the stock, which cramping might otherwise occur and cause breakage of the tools or punches.

The piercing punch 8, the notching punches 10a and the cut-off punch 12 are actuated by suitable means and for this purpose may be mounted on a massive main slide 40 reciprocating on the main frame 26 and held against the same by gibs 42. Fastened to the under side of the main side are liners 43 which slide on plates 44 fastened to the main frame. Secured to the main slide by bolts 44a, is a punch block 45 in the lower part of which is a shoe 46 in which the cut-off punch 12 fits. Resting on the punch 12 is a block 47, resting on the block 47 is a block 48, resting on the block 48 are the notching punches 10a, resting on the notching punches 10a and holding them down is a block 48a, and resting on the block 48a is a holder 49 in which the piercing punch 8 is secured by means of a set screw 50. All of the blocks and punches just referred to, together with the holder 49, are held in place by a clamp 51 bolted to the top of the punch block 45, but any of the parts thus clamped may be adjusted to suit conditions. All of these punches are backed up by adjusting screws 52 in a block 53 which in turn is backed up by the main slide 40 (Fig. 4) to which it is bolted by bolts 52a (Fig. 2). This arrangement is advantageous in producing a strong structure capable of withstanding heavy stresses.

Actuation of the main slide 40 may be effected through a pair of pitmen or connections 54 which at their ends remote from the main slide 40, are secured to eccentrics 56 mounted on a main shaft 57 and preferably integral therewith. The shaft 57 is journaled in built up bearings 58 secured to the main frame and is provided at each end with a fly wheel 59 suitably secured thereon, of which either one may be driven by a belt from a suitable source of power. For retraction of the main slide 40, each of the connections 54 is connected therewith by means of a pivot 60, but the pivot may be relieved in any suitable manner from the heavy stresses built up in advancing the main slide to effect punching, for example, by resting the main slide end of each connection 54 in a rounded recess in a shoe 61 secured to the main slide 40 and backed up by an adjusting wedge 62 between the shoe and an upward projection integral with the main slide (Figs. 3 and 4). For this purpose, the surface of the recess is substantially cylindrical and the end of the corresponding connection or connector 54 is shaped accordingly.

Actuation of the trimming punches may be effected by suitable means of which the preferred form will now be described. Mounted on the main shaft 57 and preferably integral therewith, is a pinion 63 which meshes with a gear 64 keyed to a shaft 65, mounted in bearings 66 on the main frame. On shaft 65 are two eccentrics 67 which are utilized to operate the two trimming punches 19 and, in view of the fact that these punches are actuated alternately, these eccentrics are mounted 180° apart. Connected with the eccentrics 67 by suitable straps 68 are pitmen or connections 69 which at their forward ends butt against bushings 70 in the trimming slides 71 and backed by parts of said slides. Pins 72 maintain the connection between the pitmen 69 and the trimming slides 71 during retraction thereof. Each of these slides makes one stroke for two strokes of the main slide 40 and to this end the pinion 63 on the main shaft 57 is one-half of the size of the gear 64. The trimming slides 71 move in the main slide 40 and are held in place by gibs 72a. The trimming punches 19 are carried in shoes 73 held in the slides 71 by the clamps 74, and are backed by the adjusting screws 75 which cooperate with lugs 76 projecting upwardly from the trimming slides.

It is unnecessary to move the trimming punches through as great a distance as the punches 8, 10a and 12 which are carried by the main slide 40, and the provisions for independent operation of the trimming punches 19 facilitates an arrangement whereby the punches 19 have a shorter travel than the punches on the main slide. Such shortening of the travel of the trimming punches is preferably effected by making the eccentrics 67 of smaller effective radius than the eccentrics 56 (see Fig. 3). As a result of this arrangement and the alternate actuation of the punches 19, the movements of these punches are relatively slow. Also the independent actuation of the trimming punches 19 tends to avoid any stresses that would tend to throw the punches on the main slide out of alignment with the corresponding dies.

Actuation of the feed rolls 4 may be effected in any suitable manner. According, however, to a preferred form of the invention, the front feed roll 4 is mounted on a shaft 76a which in turn is rotatably mounted on a bracket 77 bolted to the raised front end of the main frame 26, and the rear feed roll is mounted on a shaft 78 rotatable in a member 79 pivoted by a pin 79a to the bracket 77 at the left side of the machine as viewed from the front. Extending forwardly and rearwardly through the bracket or housing 77 are two rods 80 connected with the pivoted member or bearing 79 by means of a pin 81. At their front ends the rods 80 pass through a bar or strap 82 and are held therein by nuts 83 screwed on the rods at the front of the bar 82. Interposed between the bar 82 and the bracket or housing 77 is a spring 84 which urges the feed rolls together with sufficient force to enable them to grip and feed the stock. The force exerted by the spring 84 may be adjusted as desired by means of nuts 83, the extent of travel of the bar 82 being limited by a stud 85 passing through the spring 84 and the bar 82, in connection with one or more nuts 86 threaded on the stud at the forward side of the bar 82. The feed roll shafts 76a and 78 are provided at their ends remote from the feed rolls 4 with equal gears 87 which cause the feed rolls to travel at the same speed.

On the shaft 76a is a ratchet wheel 88 which is driven by a pawl 89 pivoted in shrouds 90 actuated in a suitable manner to be described hereinafter. The pawl 89 extends outwardly beyond its pivot and is provided in this extension with a roll 91 for use in throwing the pawl out of mesh with the ratchet wheel against the action of a spring 92 which normally holds the pawl against the ratchet wheel. At the outside of the roll 91, there is an arm 93, pivotally mounted at 94, to be swung against the roll 91 to throw the pawl out of operation or to be swung in the opposite direction to permit operation of the pawl. The part of the arm 93 which is engaged by the roll 91 is curved so that when in engagement with the roll, the contacting edge thereof will be substantially in the arc of a circle about the pivotal axis of the shrouds. The arm 93 is mounted on a sleeve 94a provided with an arm 95 which is manually operated by means of a link 96, an arm 97 connected therewith, a shaft 98 on which the arm 97 is mounted, and a handle 99 at the operator's side of the machine, the shaft 98 being rotatably supported by the bracket or housing 77. By means of the handle 99, the operator can readily stop the feed rolls at any time. In this connection, it may be said that the feed rolls 4 are substantially in a vertical plane, extending longitudinally of the machine midway between the sides of the frame, and the actuating mechanism for these rolls extends from said plane to the side of the machine opposite to that at which the operator is located.

The shrouds 90 may be operated in any suitable manner, for example, from a cross shaft 100 journaled in bearings 101 at the front end of the machine and rotated, in a manner to be described hereinafter, at the same speed as the main shaft 57. Mounted on cross shaft 100 is an elliptical gear 102 meshing with an elliptical gear 103 on a shaft 104 journaled in bearing 105. On the side of the elliptical gear 103 is a crank disk 106 on which is mounted, to slide crosswise thereof along suitable guiding means, a block 107 adjustable by a screw 108 to vary the throw of the shrouds 90 and pawl 89 as required. Projecting from the block 107 is a pin 108a on which is pivoted one end of a link 109 connected at its other end, by means of a pivot 110, with the shrouds 90. It should be understood that the direction of the guiding means for the block 107 and the elliptical gears 102 and 103 are so related that the greatest amount of power is transmitted to the crank disk 106 when required in feeding the stock.

The cross shaft 100 may be driven from the main shaft 57 and for this purpose is provided with a bevel gear 111 meshing with a bevel gear 112 on a longitudinal shaft 114 journaled in front and rear bearings 115 and 116 respectively, the bevel gears 111 and 112 having a two to one speed ratio. In the back part of the machine the shaft 114 is provided with a bevel gear 117 meshing with a bevel gear with a bevel gear 117 meshing with a bevel gear 118 of the same size mounted on a cross shaft 119 journaled in bearings 120. The shaft 119 is driven from shaft 65 by means of a gear 121 thereon equal to and meshing with the gear 64 on the shaft 65. In view of the one to one ratio between the gears 64 and 121 and the one to one ratio between the bevel gears 117 and 118, the longitudinal shaft 114 rotates at the same speed as the shaft 65, that is at one half the speed of the main shaft 57. Due, however, to the two to one speed ratio between the bevel gears 111 and 112, the cross shaft 100 at the front end of the machine rotates at the same speed as the main shaft 57.

The stock may be clamped firmly in position, at the time the punches operate thereon, in any suitable manner. Preferably, this is done by moving the stripper or guide 6 toward the dies 7, 10 and 11. To this end, two rods 122 (Figs. 5, 7, 24, 25) extend from the face of the stripper through perforations in lugs 123 at the sides of the stripper and through the die block 20 and the backing block to the front end of the frame of the machine, the stripper being held to these rods by nuts 124. In order to remove die block 20 from the machine, the nuts 124 may be removed from the rods 122 and the rods pulled out of the stripper and the die block toward the front end of the machine. The front ends of the rods may be screwed in blocks 125 (Figs. 24 and 25) and locked in place by nuts 126, the stripper always being kept parallel with the dies by adjusting the rods 122 in blocks 125. The faces of the blocks next to the frame of the machine are inclined and slide on the two steps of a wedge 127.

This wedge 127 travels crosswise of the machine in a bracket 128 and is driven by means of a link 129 pivotally connected therewith at one end. At its other end, the link 129 is provided with a block 130 slidable longitudinally of the link in a suitable guideway and urged toward the inner end of the guideway by means of a spring 131. Projecting from the block 130 is a pin 132 on which is pivoted the upper end of a lever 133 pivoted at 134 on the main frame. At its lower end, the lever 133 is provided with a pin 135 carrying a roll 136 which extends into a cam groove on the periphery of a cam 137 on the cross shaft 100. Obviously, when the two step wedge 127 is pulled to the right (Fig. 5) the stripper is pulled toward the die block and clamps the stock rigidly in position against the adjacent dies. The spring 131 tends to prevent breakage and permits the clamping means to adjust itself in accordance with different conditions.

As already described, the crowning die 15 may be provided with a countersinking pin 16 and an ejector sleeve 17 surrounding the pin and actuated to eject a nut blank from the crowning die during the retreat of the cut-off punch. Preferably, the pin extends from the interior of the crowning die 15 through the die block 20 and also the backing block or upright portion of the main frame 26 into a lug 138 projecting upwardly from a slide 139. The pin 16 is threaded into the lug 138 which is split and provided with a binding bolt 140, thus serving also as a clamp. The pin can easily be adjusted in the lug to get the correct depth of countersink in the crown face of the nut and can then be clamped in this position by tightening the binding bolt 140.

The ejector sleeve 17 extends from the bottom of the cup in the crowning die 15 through the die block and frame and is threaded into a split clamp 141 and may be held tightly therein by a binding bolt 142. Adjustment of the sleeve in the clamp 141 may be effected by use of nuts 143. The clamp is provided with a lug 144 (Fig. 24) which projects downwardly into the forked upper end of the lever 145 pivoted at 146 on a lug 146a projecting downwardly from the slide 139. At its lower end, the lever 145 is provided with a pin 147 carrying a roll 148 resting on the periphery of a cam 149 on the cross shaft 100, the roll or cam follower 148 being held against the cam by means of a spring 150 connecting the upper part of the lever with a pin projecting downwardly from the slide 139. Obviously, as the high part of the cam passes under the roll 148, the ejector sleeve 17 will be advanced and a nut blank ejected from the crowning die and pushed off the countersinking pin 16 and into one of the transfer devices 14. The high part of the cam 149 extends a relatively short distance around the periphery of the cam (Fig. 7) and, inasmuch as shaft 100 revolves at the same speed as the main shaft 57, it will be evident that the cam will act to advance the ejecting sleeve quickly and then release it for retraction by the spring 150 out of the way of the transfer means by which nut blanks are supplied to the finishing dies and punches.

The slide 139 is preferably carried by a bracket 151, bolted to the main frame of the machine, and is held against the main frame of the machine by set screw 152 in a bridge 153 which swings on a pin 154 carried by the bracket. In order to take the die block 20 from the machine, it is necessary to withdraw the countersinking pin 16 and the ejector sleeve 17. Inasmuch as these parts are mounted on slide 139, all that is necessary is to back up the set screw 152, swing the bridge 153 out of the way, and pull back the slide until the countersinking pin 16 and the ejector sleeve 17 are pulled clear of the die block. This may be done without any disturbance of the adjustments of the parts carried by the slide.

Each transfer device or blank receiver 14 is preferably made up of two parallel spring fingers 155 (Fig. 6) formed at their free ends with cooperating parts to receive and hold a nut blank. At their outer ends, the spring fingers of each device are secured on opposite sides of a spacer block as by a bolt. The respective blocks 156, 156a of the transfer devices (Fig. 7) are secured to the tops of upright brackets 158, 159 by means including bolts 157a, 157b, and longitudinal adjustment is permitted by providing elongated slots in the brackets, slidably engaged by the bolts as shown on Fig. 7. Vertical alignment may be insured by key projections 157c on the blocks engaging slideways in the contacting surfaces of the brackets. These brackets are mounted for endwise movement of the transfer fingers, upon two rods 160 arranged horizontally one above the other and slidably mounted in suitable bearings in the opposite sides of the frame of the machine.

The brackets 158 and 159 may be connected with the rods 160 in any suitable manner. Preferably, however, the bracket 158 is clamped to the upper rod 160, by means which may include a clamping screw 158a, and is not connected directly with the lower rod, and the bracket 159 is clamped to the lower rod 160 by means of a screw 159a and receives the upper rod in such a manner as to leave it free to turn thereon. At the operator's side of the machine (the left in Fig. 6), the rods 160 are clamped to a bar 161 through the center of which passes a stud 162 fixed in the main frame and carrying two sets of nuts 163 which may be adjusted to determine the extent of the reciprocating movement and the limits of such movement so as to assure proper positioning of the transfer devices to receive the nuts ejected from the crowning die. It will be evident that the transfer devices may be adjusted toward and from each other by shifting the brackets 158 and 159 along the corresponding rods 160 or by shifting one of the rods 160 with reference to the bar 161. The arrangement just described also permits shifting of the parts to enable removal of the die block, as by unclamping the upper rod 160 from the bar 161, and swinging the bracket 158 downwardly out of the way when the corresponding transfer device 14 is withdrawn from the die.

In view of the action of the stops or nuts 163, it is necessary to provide for yielding in the means for reciprocating the rods 160. To this end these rods may be driven by actuation of a bracket 164 slidable on both of them and yieldably held in position on the lower rod by springs 165 interposed between the bracket 164 and collars 166 secured in position on said lower rod. This arrangement in connection with the stops formed by the nuts 163 provides suitable dwell periods during which nut blanks may be inserted in and removed from the transfer devices, and also provides for a limited amount of yielding in case the transfer devices are obstructed in their movements.

The bracket 164 may be actuated in any suitable manner. Preferably, however, it is actuated from the longitudinal shaft 114 by means of a cam 167 cooperating with rolls 168 and 169 on a yoke 170 slidable on a block 171 held against movement along the shaft by the cam 167 on the one side and a collar 171a (Fig. 3) on the other. The yoke 170 is connected by a rod 172 to a lever 173 on a shaft 174 journaled in brackets 175 projecting from the base of the machine at one side thereof. Fixed on the shaft 174 beneath the rods 160 is an arm or lever 176 which is forked to embrace the lower end of the bracket 164 and also to receive blocks 177 which are free to turn on pins 178 projecting from opposite sides of this bracket. The dwell portions of the cam 167, that is the parts which extend in arcs of circles about the axis, are relatively long so that each transfer device 14 is held in one position for a considerable time and then quickly shifted to its other position. In this connection, it should be noted that shaft 114 revolves at half the speed of the main shaft 57 and of the cross shaft 100.

In order to guard against breakage, the lever 173 is not fixed on the shaft 174, but is yieldingly connected therewith. For this purpose, the hub of this lever may be provided at one end with a hardened steel disc 179 (Figs. 3 and 4) fixedly secured thereto and provided with a tongue 180 with inclined sides, extending across its outer surface and fitting into a groove in a collar 181 which is free to slide along the shaft 174 but is held from turning in any suitable manner. The collar 181 is urged against the disc 179 by means of spring 182 interposed between the collar and a washer 183 secured on the end of the shaft by suitable means such as nuts 184. The lever 173 is held against sliding along the shaft 174 in the opposite direction by means of a collar 185 fixed on the shaft in any suitable manner. When the resistance to operation becomes excessive, the tongue 180 will ride out of the groove in collar 181. This connection, therefore, constitutes a safety device whereby the driving means for the transfer devices is disabled when too great resistance is encountered.

Obviously, the levers or arms 173 and 176 might be mounted close together and form arms of one lever, thus eliminating the shaft 174. This would, however, cause the cam 167 to be positioned beneath the punching devices where its action might be interfered with by waste material dropping at this point. As illustrated, the cam is under the main slide which protects it from any waste metal or other material which might otherwise fall thereon.

It will be evident that by actuating the feed rolls 4, the ejector sleeve 17, and the stripper 6 from the cross shaft 100 at the front end of the machine, the establishment and maintenance of proper timing relations between these parts is facilitated.

The operation of the machine has already been described generally and the main operations are clearly brought out in the timing diagram of Fig. 26 and in Figs. 16 to 22, inclusive, showing the lower end of the stock and changes in the nut blank after it is cut off from the stock.

I claim:

1. In a machine for making nut blanks, a series of nut-blank-forming devices performing different operations on a bar including a cut-off die and a reciprocating cut-off punch at the end of the series to cut off a nut blank, means for feeding the bar downwardly into the machine and to said nut-blank-forming devices, a trimming and shaping die back of side cut-off die and spaced therefrom into which the cut-off blank is advanced by the cut-off punch in its advance movement, and means for ejecting the nut from the trimming and shaping die into the space between the same and the cut-off die.

2. In a nut blank machine, two nut-blank-trimming devices spaced apart substantially horizontally, a trimming and crowning die midway between said trimming devices, a cut-off die in front of said trimming and crowning die and spaced therefrom a distance greater than the thickness of the nut blanks, a yielding grip transfer device receiving nut blanks between said cut-off and trimming and crowning dies and transferring them alternately in opposite directions to the corresponding trimming devices, a cut-off punch, means for operating said cut-off punch to cooperate with said cut-off die in cutting out a nut blank and to force the same completely through the transfer device into the trimming and crowning die and then to withdraw, and means for ejecting the nut blank from the trimming and crowning die and placing it in the transfer device.

3. In a nut blank machine, two nut-blank-trimming devices spaced apart horizontally, a counter-sinking and trimming device between said trimming devices, a cut-off die in front of the countersinking and trimming device and spaced therefrom, a transfer device receiving nut blanks between said cut-off die and the countersinking and trimming device and transferring them alternately in opposite directions to the corresponding trimming devices, a cut-off punch, means for operating said cut-off punch to cooperate with said cut-off die in cutting out a nut blank and forcing it completely through the cut-off die and the transfer device into engagement with the countersinking and trimming device and then to withdraw, and means for ejecting the nut blank from the countersinking and trimming device and placing it in the transfer device.

4. In a nut blank machine having two nut-blank-trimming devices spaced apart, means for delivering nut blanks midway between the nut-blank-trimming devices, a reciprocating transfer device including two yielding blank-receivers spaced apart half the distance between said nut-blank-trimming devices, yielding means for actuating said transfer device to position the blank receivers alternately at the corresponding nut-blank-trimming devices and at the nut blank delivering means, and adjustable means for limiting the reciprocation of said transfer device in both directions to assure accurate positioning of the blank receivers.

5. In a machine for making nut blanks from bars having means for cutting off nut blanks and delivering them in succession to a predetermined point and trimming dies and punches equidistant from said point at opposite sides thereof, means for transferring nut blanks from said point alternately in opposite directions to positions at the front of the corresponding trimming dies, such transferring means including a reciprocating frame and pairs of parallel spring fingers supported at their outer ends from the frame and extending towards each other whereby the inner ends of said pairs will be brought alternately to said predetermined point to receive alternate blanks therebetween and to positions in front of the trimming dies where the blanks will be removed from the spring fingers by the trimming punches.

6. In a machine of the class described having means for cutting off nut blanks and delivering them in succession to a predetermined point and trimming dies equidistant from said point at opposite sides thereof, means for transferring nut blanks from said point alternately in opposite directions to positions at the front of the corresponding trimming dies, including two parallel reciprocating rods, means for clamping the rods against relative longitudinal movement, two nut blank receivers to transfer the nut blanks, a supporting bracket for one nut blank receiver secured on one of said rods, a supporting bracket for the other nut blank receiver secured on the other of said rods, a driving member slidable on both of said rods, and a connection between said driving member and said rods yieldable in both directions.

7. In a machine of the class described means for delivering nut blanks in succession to a predetermined point and trimming dies equidistant from said point at opposite sides thereof, means for transferring nut blanks from said point alternately in opposite directions to positions at the front of the corresponding trimming dies, including two parallel reciprocating rods, means for clamping the rods against relative longitudinal movement, two nut blank receivers to transfer the nut blanks, a supporting bracket for one nut blank receiver secured on one of said rods, a supporting bracket for the other nut blank receiver secured on the other of said rods and loosely embracing the first rod, a driving member slidable on both of said rods, a connection between said driving member and said rods yieldable in both directions, and means for actuating said driving member including a safety device to prevent breakage when movement of the rods is prevented.

8. In a machine of the character described, means for feeding a strip step-by-step in a predetermined path, a series of dies arranged in order along said path and including a cut-off die at the bottom thereof, punches to cooperate with said dies, a die block in the face of which said dies are mounted, a backing for said die block, a stripper at the front of said dies, rods connected with said stripper and extending through said die block and backing, wedging means cooperating with said backing for drawing the stripper toward said dies to clamp the strip, actuating means for said punches, and a connection between said actuating means and said wedging means including a yielding connection to limit the action of said wedging means.

9. In a nut blank machine, means for feeding a bar downwardly step-by-step along a predetermined path, a series of dies arranged along said path including a cut-off die at the lower end of the series, a corresponding series of punches including a cut-off punch, trimming dies equidistant from the cut-off die at opposite sides thereof and spaced rearwardly from the rear of the cut-off die, trimming punches to cooperate with said trimming dies, a laterally removable die support open from the sides to the rear of the cut-off die, and means for transferring nut blanks from the rear of the cut-off die alternately in opposite directions to the trimming dies including a laterally slidable frame, nut blank receivers extending inwardly from opposite directions to pass to the rear of said cut-off die, and adjustable supporting means for one of said nut blank receivers whereby it may be released and swung out of the path of removal for the die support.

10. In a nut blank machine, a crowning and countersinking die, a die block containing said die, a backing supporting said die from the rear, a countersinking pin and a surrounding ejecting sleeve both extending through said backing and block into the back of said die, a removable member at the side of the backing opposite to that where the die is located, and means for mounting said pin and sleeve on said removable member in adjusted position whereby they can be withdrawn from the die block to permit sidewise removal of the latter without changing their adjustment relative to each other.

11. In a nut blank machine, a crowning and countersinking die, a die block containing said die, a stationary backing for said die, a countersinking pin and a surrounding ejector extending through said backing and die block into the back of said die, a slide at the far side of said backing movable in the direction of said pin and ejector, stationary guides for said slide, means for adjustably securing said pin on said slide, ejector operating means on said slide including a cam follower and an adjustable connection between the ejector and said cam follower, and a cam positioned to operate said cam follower when the slide is in normal position.

12. In a nut blank machine, a vertical series of dies adapted to act on a bar and including at one end a cut-off die, finishing dies at opposite sides of said cut-off die, punches adapted to cooperate with all of said dies, means for reciprocating at regular intervals the punches cooperating with the vertical series including a reciprocating main slide on which these punches are mounted, and means for reciprocating each of the punches cooperating with the finishing dies half as frequently as the other punches, including trimming slides mounted on the main slide.

13. In a machine of the class described having a plurality of dies to cooperate with corresponding reciprocating punches, a die block to receive said dies, a main frame having an upright portion rigidly supporting said die block at its back, means for adjusting the die block vertically, and means for adjusting the die block horizontally including a fixed member adjacent to one side edge of the die block, a sleeve threaded through said fixed member to engage said side edge of the die block, and a screw passing through the sleeve and threaded into the die block, the shank of the screw being of smaller diameter than the bore of the sleeve to permit vertical adjustment of the die block and the head of the screw extending across the outer end of the sleeve to enable the screw to pull the die block against the sleeve.

14. In a machine of the class described having a plurality of dies to cooperate with corresponding reciprocating punches; a block to receive said dies; a main frame having an upright backing block rigidly supporting said die block at its back; means for adjusting the die block vertically; means for adjusting the die block horizontally including a fixed member adjacent to one side edge of the die block, a sleeve threaded through said fixed member to engage said side edge of the die block, and a screw passing through the sleeve and threaded into the die block, the shank of the screw being of smaller diameter than the bore of the sleeve to permit vertical adjustment of the die block and the head of the screw extending across the outer end of the sleeve to enable the screw to pull the die block against the sleeve; and means for securing said die block in position including a bolt passing through said backing block and threaded into the die block, the backing block being provided for this purpose with a hole of greater diameter than the bolt to permit adjustment of the die block with respect to the backing block.

15. In a machine for making nut blanks by means of dies and punches, a die support for holding dies with their axes parallel and extending horizontally, said die support having a central die holder and two side die holders arranged at the same level on opposite sides of the central die holder, a horizontally reciprocating main slide having a central punch holder to cooperate with said central die holder, secondary slides mounted in the main slide opposite the secondary die holders, punch holders on said secondary slides to cooperate with the side die holders, means for alternately transferring nut blanks from the central die support to the side die supports, and actuating means for said slides whereby the secondary slides are operated alternately and each of them is actuated at alternate advance movements of the main slide.

16. In a machine of the class described, a die block, a plurality of dies arranged in order vertically in the central part of the face of the die block by which they are backed, trimming dies on opposite sides of said plurality of dies and having openings communicating with the back of the die block, a backing block back of said die block, and backing screws for said trimming dies threaded through said backing block from the far side thereof and serving to adjust the trimming dies in position.

17. In a machine of the class described, a die block, a plurality of dies arranged in order vertically in the central part of the face of the die block by which they are backed, trimming dies on opposite sides of said plurality of dies and having openings communicating with the back of the die block, a backing block back of said die block, and backing screws for said trimming dies threaded through said backing block from the far side thereof and serving to adjust the trimming dies in position, said backing screws having axial openings through which the finished nut blanks pass to the far side of the backing block where they are discharged.

18. In a machine of the character described, means for intermittently feeding a strip in a predetermined path, a series of dies arranged in order along said path and including a cut-off die at the bottom thereof, punches to cooperate with said dies, a die block in the face of which said dies are mounted, a backing for said die block along which the die block may be moved edgewise for removal from the machine, a stripper at the front of said dies, rods extending through said die block and backing, a detachable connection between the rods and the stripper to enable the rods to be moved from the die block into the backing when it is desired to withdraw the die block edgewise, wedging means cooperating with said rods and said backing for drawing the stripper toward the dies to clamp the strip during the punching, actuating means for said punches, and a connection between said actuating means and said wedging means to actuate the latter.

19. In a nut blank machine, a die block, a fixed backing therefor along which the die block can be moved sidewise for insertion in or removal from the machine, a crowning die mounted in said die block, means for forcing a nut blank into said crowning die, and countersinking and ejecting means extending into the bottom of said crowning die, said countersinking and ejecting means being mounted for withdrawal from the bottom of said die to enable such sidewise withdrawal of the die block.

20. In a nut blank machine, a vertical series of dies adapted to act on a bar and including at one end a cut-off die, finishing dies at opposite sides of said cut-off die, punches adapted to cooperate with all of said dies, means for reciprocating at regular intervals the punches cooperating with the vertical series including a reciprocating main slide on which these punches are mounted, and means for reciprocating each of the punches cooperating with the finishing dies half as frequently as the other punches.

21. In a machine for making nut blanks by means of dies and punches, a die support for holding dies with their axes parallel and extending horizontally, said die support having a central die holder and two side die holders arranged at the same level on opposite sides of the central die holder, a horizontally reciprocating main slide having a central punch holder to cooperate with said central die holder, side punch holders slidable on said main slide to cooperate with the side die holders, means for alternately transferring nut blanks from the central die support to the side supports, and actuating means for said main slide and said side punch holders whereby the side punch holders are operated alternately and each of them is actuated at alternate advance movements of the main slide.

22. In a nut blank machine, a vertical series of dies adapted to act on a bar and including at one end a cut-off die, finishing dies at opposite sides of said cut-off die, punches adapted to cooperate with all of said dies, means for reciprocating at regular intervals the punches cooperating with the vertical series including a reciprocating main slide on which these punches are mounted, and means for reciprocating each of the punches cooperating with the finishing dies half as frequently as the other punches and through a shorter distance.

EUGENE V. KUEBRICH.